(12) United States Patent
Hamilton et al.

(10) Patent No.: US 12,005,725 B2
(45) Date of Patent: Jun. 11, 2024

(54) METHOD OF FORMING A SURFACE COVERING WITH SUBSTRATE, PHASE TRANSITION LIQUID AND PLASTICIZER

(71) Applicants: John Hamilton, Shropshire (GB); Andrew McVitie, Shropshire (GB); Derek Smith, Shropshire (GB)

(72) Inventors: John Hamilton, Shropshire (GB); Andrew McVitie, Shropshire (GB); Derek Smith, Shropshire (GB)

(73) Assignee: Ricoh Company, Ltd., Tokyo (JP)

( * ) Notice: Subject to any disclaimer, the term of this patent is extended or adjusted under 35 U.S.C. 154(b) by 577 days.

(21) Appl. No.: 16/349,412

(22) PCT Filed: Dec. 11, 2017

(86) PCT No.: PCT/JP2017/044433
§ 371 (c)(1),
(2) Date: May 13, 2019

(87) PCT Pub. No.: WO2018/110518
PCT Pub. Date: Jun. 21, 2018

(65) Prior Publication Data
US 2019/0375222 A1    Dec. 12, 2019

(30) Foreign Application Priority Data
Dec. 15, 2016    (EP) ..................................... 16204418

(51) Int. Cl.
*B41M 5/00*    (2006.01)
(52) U.S. Cl.
CPC ........ *B41M 5/0017* (2013.01); *B41M 5/0047* (2013.01)

(58) Field of Classification Search
None
See application file for complete search history.

(56) References Cited

U.S. PATENT DOCUMENTS

| | | |
|---|---|---|
| 3,293,094 A | 12/1966 | Nairn et al. |
| 3,321,413 A | 5/1967 | Riley et al. |
| (Continued) | | |

FOREIGN PATENT DOCUMENTS

| | | | |
|---|---|---|---|
| CA | 2196799 A1 | * 2/1996 | |
| CA | 3054300 A1 | * 8/2018 | ............. B33Y 10/00 |
| (Continued) | | | |

OTHER PUBLICATIONS

CN-101487955-A translation (Year: 2023).*
(Continued)

*Primary Examiner* — Jeffrey M Wollschlager
*Assistant Examiner* — Guy F Mongelli
(74) *Attorney, Agent, or Firm* — IPUSA, PLLC

(57) ABSTRACT

The present invention relates to a method of forming a surface covering for example wallpaper or a floor covering and an apparatus for forming a surface covering, in which a surface covering raw material is supplied, the surface covering raw material comprising a substrate and a resin layer comprising a resin and a carrier liquid, the resin being dispersed in the carrier liquid and being capable of gelling or curing with the carrier liquid. A pattern is then applied to the resin layer by inkjet printing, and the surface covering raw material with the pattern formed on the resin layer is heated to gel or cure the resin layer to thereby prepare a surface covering.

15 Claims, 4 Drawing Sheets

(56) References Cited

U.S. PATENT DOCUMENTS

| | | | |
|---|---|---|---|
| 3,660,187 A | 5/1972 | Shortway et al. | |
| 4,022,643 A * | 5/1977 | Clark | B44C 1/24 156/289 |
| 4,100,318 A * | 7/1978 | McCann | B32B 5/20 427/407.1 |
| 5,122,187 A * | 6/1992 | Schwarz | C09D 11/34 346/99 |
| 5,667,568 A * | 9/1997 | Sacripante | C09D 11/34 106/31.35 |
| 5,712,018 A | 1/1998 | Frisch | |
| 6,391,440 B1 * | 5/2002 | Yoshino | B41M 5/5227 347/103 |
| 2001/0028127 A1 * | 10/2001 | Hinds | B29C 43/30 264/126 |
| 2002/0056936 A1 * | 5/2002 | Moran | C08L 27/06 521/65 |
| 2002/0128351 A1 * | 9/2002 | Kiguchi | C09D 11/36 523/161 |
| 2003/0021961 A1 | 1/2003 | Ylitalo et al. | |
| 2003/0067527 A1 * | 4/2003 | Temple | B41M 7/0081 347/101 |
| 2003/0157278 A1 * | 8/2003 | Takahashi | B41M 5/506 428/32.13 |
| 2004/0131872 A1 * | 7/2004 | Fan | G02B 5/23 428/411.1 |
| 2004/0135280 A1 * | 7/2004 | O'Nien | B29C 70/305 425/200 |
| 2004/0179076 A1 * | 9/2004 | Cohen | B41M 7/009 347/100 |
| 2005/0195260 A1 * | 9/2005 | Figov | B41M 7/0081 347/102 |
| 2007/0272118 A1 * | 11/2007 | Kashani | E06B 3/721 106/14.34 |
| 2008/0006175 A1 * | 1/2008 | King | C09D 11/36 106/31.6 |
| 2008/0038570 A1 * | 2/2008 | Satou | C09D 4/00 428/483 |
| 2009/0111701 A1 * | 4/2009 | Ahn | C09D 5/00 506/7 |
| 2010/0099784 A1 * | 4/2010 | Su | C08J 9/103 521/97 |
| 2010/0125499 A1 * | 5/2010 | Cuch | B41M 5/30 705/14.45 |
| 2010/0227075 A1 * | 9/2010 | Belelie | B41M 7/0081 427/256 |
| 2010/0227076 A1 * | 9/2010 | Yokoi | C08F 2/50 427/504 |
| 2010/0251928 A1 | 10/2010 | Carlini et al. | |
| 2011/0234727 A1 * | 9/2011 | Aoki | B41M 5/0011 347/102 |
| 2011/0315049 A1 | 12/2011 | Aoki et al. | |
| 2012/0026225 A1 * | 2/2012 | Mataki | B41J 2/2107 347/54 |
| 2012/0295042 A1 * | 11/2012 | Nito | B41M 5/5227 428/32.23 |
| 2013/0201264 A1 | 8/2013 | Terakado et al. | |
| 2013/0249996 A1 | 9/2013 | Saito et al. | |
| 2015/0175764 A1 | 6/2015 | Lensbouer et al. | |
| 2015/0190964 A1 * | 7/2015 | Okamoto | B33Y 30/00 428/192 |
| 2015/0309370 A1 * | 10/2015 | Park | G02F 1/13378 264/2.7 |
| 2016/0145449 A1 * | 5/2016 | Hilgers | C09D 4/00 522/18 |
| 2016/0297223 A1 * | 10/2016 | Langenscheidt | B41M 7/00 |
| 2016/0325558 A1 * | 11/2016 | Strijckers | B44C 5/0469 |
| 2016/0347084 A1 * | 12/2016 | Clement | B32B 21/08 |
| 2017/0058456 A1 * | 3/2017 | Loccufier | B32B 3/06 |
| 2017/0369400 A1 | 12/2017 | Hinoishi et al. | |
| 2018/0169695 A1 * | 6/2018 | Satou | B41M 5/52 |
| 2018/0320320 A1 | 11/2018 | Moriya et al. | |

FOREIGN PATENT DOCUMENTS

| | | | | |
|---|---|---|---|---|
| CN | 101487955 A | * | 7/2009 | C08L 79/08 |
| CN | 102591071 A | * | 7/2012 | C08L 79/08 |
| CN | 103045268 A | * | 4/2013 | C08G 73/1032 |
| CN | 103436095 A | * | 12/2013 | |
| CN | 103608183 A | * | 2/2014 | B05D 3/067 |
| CN | 106009899 A | * | 10/2016 | A61L 31/042 |
| CN | 106193529 A | * | 12/2016 | B41M 1/34 |
| EP | 1892271 | | 2/2008 | |
| JP | H10264501 | | 10/1998 | |
| JP | 4897848 | | 3/2012 | |
| JP | 2012219142 A | * | 11/2012 | C08F 2/48 |
| JP | 2017-105162 | | 6/2017 | |
| JP | 2018-012319 | | 1/2018 | |
| JP | 2018-153975 | | 10/2018 | |
| KR | 10-2011-0010587 | | 2/2011 | |
| WO | WO-0153387 A1 | * | 7/2001 | B05D 5/02 |
| WO | 2017/090222 | | 6/2017 | |
| WO | 2018/008588 | | 1/2018 | |
| WO | 2018/168675 | | 9/2018 | |

OTHER PUBLICATIONS

CN-102591071-A translation (Year: 2023).*
CN-103045268-A translation (Year: 2023).*
CN-106009899-A translation (Year: 2023).*
CN-106193529-A translation (Year: 2023).*
CN 103436095 translation (Year: 2023).*
CN 1505458 translation (Year: 2004).*
CA 2196799 (Year: 1996).*
CN 103436095 (Year: 2013).*
Korean Office Action for 10-2019-7016119 dated Sep. 12, 2020.
Russian Office Action for 2019117566 dated Aug. 19, 2020.
International Search Report dated Mar. 14, 2018 in PCT/JP2017/044433 filed on Dec. 11, 2017.
European Search Report for 17206543.5 dated Apr. 10, 2018.

* cited by examiner

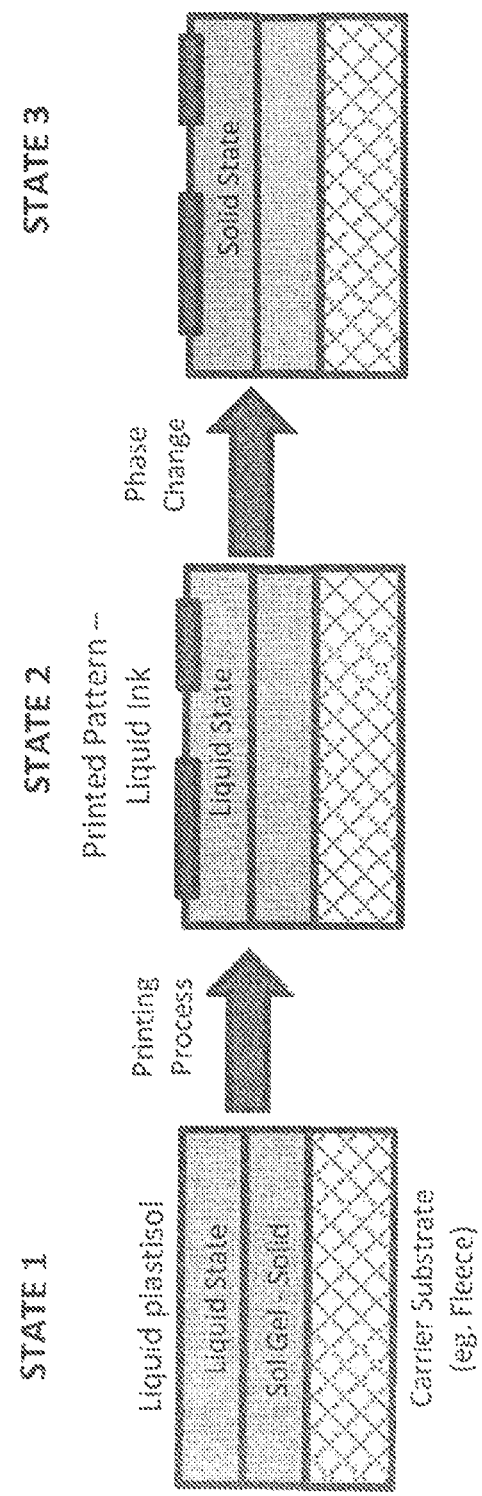

METHOD OF FORMING A SURFACE COVERING WITH SUBSTRATE, PHASE TRANSITION LIQUID AND PLASTICIZER

TECHNICAL FIELD

The present invention relates to a method of forming a surface covering for example wallpaper or a floor covering, an apparatus for forming a surface covering, and a surface covering.

BACKGROUND ART

Wallpaper is widely used in buildings to give a desirable finish and appearance to walls. Similarly, floor coverings formed of sheet-like material can be used to provide floor surfaces with a desired finish and appearance. These surface coverings typically comprise a sheet-like substrate to provide strength and to define a suitable surface for adhering to a surface such as a wall or floor. The surface covering also includes a layer formed of resin which provides scratch and stain resistance and also affects the appearance of the surface covering. Typically, the resin layer comprises a polyvinyl chloride-based resin containing an ester-oil-based plasticizer and a foaming agent. The resin layer is typically applied to the substrate as a wet coating dispersion which is then heat treated to at least partially gel the components of the resin layer so that a stable and durable resin layer can be formed which is suitable for subsequent manufacturing steps, such as foaming, printing and three-dimensional decoration, as described below. The resulting resin layer is typically described as a semi-gel, pre-gel or sol-gel layer. Normally there will be a subsequent step of further heating to convert this layer into a full gel layer. As part of the manufacturing process of the surface covering, a foaming agent may be used to foam the resin layer to enable the surface covering to be expanded and embossed for decorative effect. The foamed resin layer obtained in this way also has depth and three-dimensional decoration can be formed in the resin layer. This may be achieved by mechanical embossing means or by chemical means.

In many cases, a decorative pattern is applied to the wallpaper. This can be achieved by printing a pattern onto the surface of the resin layer. Although conventional printing techniques have been used for many years, recently interest has been shown in printing a pattern onto the resin layer with a computer controllable printing machine such as an inkjet printer. JP 4897848 B discloses an inkjet printing method of making wallpaper which uses an oil-based ink. Oil-based inks are attractive because they can provide high-density images and because they have good resistance to clogging in the inkjet printing apparatus.

SUMMARY OF INVENTION

Technical Problem

In attempts to produce wallpaper by printing a pattern onto the resin layer using an inkjet printer, it has been discovered that the resin layer, typically vinyl chloride, has poor absorption of the inkjet ink. This can lead to poor image quality and poor image durability. Sometimes, the image can be easily rubbed off.

Accordingly, an object of the present application is to provide a method of forming a surface covering, an apparatus for forming a surface covering and a surface covering which can overcome the problems outlined above. In particular, it is desired to improve absorption of ink applied in an inkjet printing process and durability of an image formed in an inkjet printing process.

Solution to Problem

The present inventors have discovered that, contrary to normal practice, a pattern can be printed directly onto a liquid resin layer comprising a dispersion of resin in a carrier liquid, before the dispersion undergoes a phase transition from liquid to solid, for example before it is gelled or cured in the manner described above. Surprisingly, this gives excellent wetting of the ink onto the liquid resin layer, resulting in improved image uniformity and optical density. Furthermore, a fresh, liquid coating has very uniform surface energy and therefore provides a uniform surface for low viscosity ink jet inks. This not only results in good wetting but more importantly gives uniform wetting across the substrate and therefore excellent colour uniformity, especially in block colour areas.

Furthermore, the present invention provides an additional advantage in that it allows an image to be applied directly onto a liquid resin layer without the need for any specific pre-treatment, undercoat or ink accepting layer which requires designated chemistry for inkjet imaging systems.

The finished surface covering is found to have excellent image durability. It is found that rub resistance and spreading of the inkjet ink on the resin layer can be improved.

Without being bound by theory, for non-contact printing systems where a pattern forming composition such as liquid ink is applied to a solid surface, the final print quality and rub resistance is influenced by several factors. Spreading (dot gain) performance is influenced by ink surface tension and substrate surface energy, ink carrier fluid evaporation rate and ink absorbance rate into the substrate. Rub resistance (fixing) performance is influenced by colourant adhesion to the substrate and colourant position in relation to the substrate surface. It is believed that the present invention allows the colourant to be fully or partially assimilated into the liquid resin layer so that the risk of it being mechanically rubbed from the surface in the finished surface covering is reduced or eliminated. Applying the pattern to the liquid resin layer before it undergoes a phase transition from liquid to solid is understood to affect the surface energy conditions to advantageously affect the behaviour of the pattern forming composition to improve spreading effects.

Accordingly, in a first aspect, the present invention provides a method of forming a surface covering, comprising the steps of:
supplying a surface covering raw material comprising:
a substrate and a liquid resin layer comprising a resin dispersed in a carrier liquid, the liquid resin layer being capable of undergoing a phase transition from liquid to solid;
applying a pattern to the liquid resin layer by inkjet printing, and heating causing the liquid resin layer with the pattern formed on the liquid resin layer to undergo a phase transition from liquid to solid to thereby prepare a surface covering In a further aspect, the present invention provides an apparatus for forming a surface covering, comprising: a feed of a surface covering raw material, the surface covering raw material comprising a substrate and a liquid resin layer, the resin layer comprising a resin dispersed in a carrier liquid, the liquid layer being capable of undergoing a phase transition from liquid to solid; an inkjet printer for applying a pattern forming material in a predetermined pattern to the liquid resin layer formed on the substrate; and an apparatus for causing the liquid resin layer with the pattern formed thereon to undergo a phase transition from liquid to solid to thereby prepare the surface covering.

In a further aspect, the present invention provides a surface covering, obtainable by the method of the invention.

BRIEF DESCRIPTION OF DRAWINGS

The present application will be further described by way of example only with reference to the accompanying drawing, in which:

FIG. 2B schematically depicts an example method of forming a surface covering of the present invention.

DESCRIPTION OF EMBODIMENTS

Figure 1:
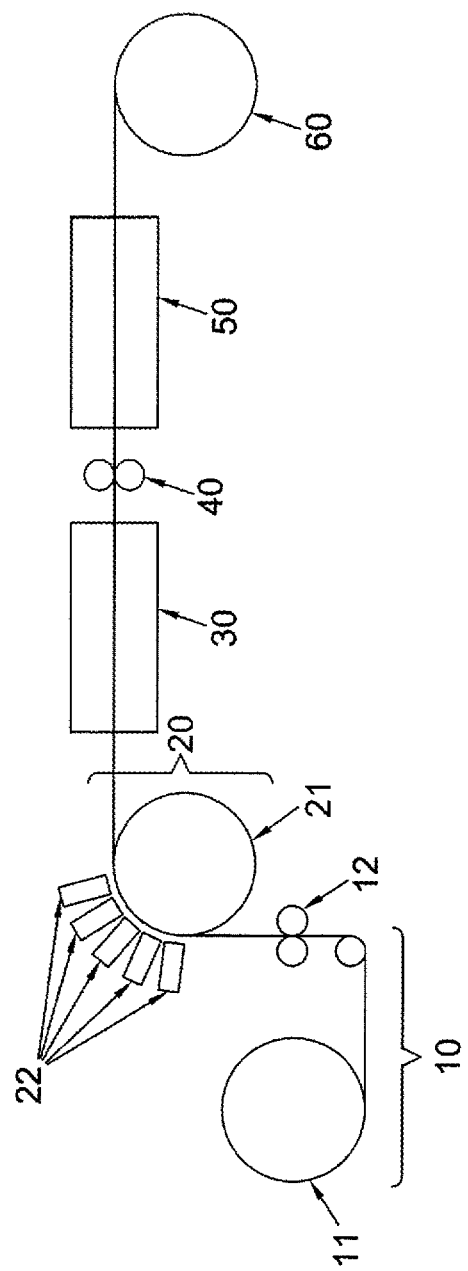
FIG. 1 is a schematic view of an apparatus for forming a surface covering according to an embodiment of the present invention.

Optional and preferred features of the present invention will be described further below.

According to the present invention, a pattern is applied to a liquid resin layer which is capable of undergoing a phase transition from liquid to solid, for example by being gelled or cured, before the liquid resin layer undergoes the phase transition. In conventional methods, the resin layer would be gelled before application of the pattern. By 'liquid' it is meant that the material of which the layer is formed can conform to the shape of its container. It is possible to test whether the material is a liquid or solid as follows. A 50 ml sample of the material is placed in an open topped container. The surface of the sample is deformed by picking a portion away by removing a 5 ml sample with a spatula. The sample is left for 6 hours. If the deformed part does not come back into the former state, it is a gel, if it does come back into the former state, it is a liquid (sol). The material of which the layer is formed is preferably liquid at the temperature at which the pattern is applied to the liquid resin layer, preferably at 25° C.

Preferably, the surface covering raw material is not subjected to any curing or gelling treatment after application of the liquid resin layer and before application of the pattern. In particular, it is preferably not heated to a temperature that is equal to or greater than the glass transition temperature of the resin in the liquid resin layer after application of the liquid resin layer and before application of the pattern. In the case that a polyvinyl chloride-based resin is used, it should not be heated to a temperature that is equal to or greater than 81° C. after application of the liquid resin layer and before application of the pattern.

It is also possible that the surface covering raw material may be subjected to a partial curing or gelling treatment after application of the liquid resin layer and before application of the pattern, the curing or gelling treatment being such that the liquid resin layer remains liquid.

As will be described in further detail below, the liquid resin layer preferably comprises a resin such as vinyl chloride resin with a carrier liquid such as a liquid plasticizer and optionally other components. Again, as will be described further below, the pattern which is formed may comprise a visible pattern formed with ink or it may comprise a pattern of a chemical embossing composition, or both. The present invention includes a step in which the liquid resin layer undergoes a phase transition from liquid to solid. Preferably, the present invention includes a step of heating the surface covering raw material. The heating step may be carried out to gel or cure the liquid resin layer with the pattern in place. Preferably, where the resin comprises a foamable layer, the heating step is carried out at a temperature which will allow foaming to occur at the same time, as will be described further below.

The surface covering to be produced by the invention may comprise any suitable surface covering, but is preferably wallpaper or a floor covering material. The surface covering of the present invention comprises a substrate and a resin layer formed on the substrate.

The substrate may be any conventional substrate. Typically, it is a flat substrate, for example a flat sheet-like material. It may be formed of paper, non-woven fabric, plastic, wood, metal or combinations of these materials. Specific examples may be selected from natural paper, plastic film, synthetic paper, non-woven fabric, fleece, cloth, wood, semi-cure wallpaper (in which a solid resin layer is present in the form of a semi-gel), full-cure wallpaper, metal sheet, and metal thin film or any combination of these materials. In a preferred embodiment, the substrate comprises a fleece-backed paper.

The substrate is preferably selected from a plastic film, a synthetic paper sheet made of a synthetic fiber, or a non-woven fabric sheet if water resistance is required. Specific examples of the plastic film include, but are not limited to, a polyester film, a polypropylene film, a polyethylene film, and a laminated body of nylon, vinylon, and/or acrylic films or sheets. The plastic film is preferably subjected to uniaxial to biaxial drawing for improving its strength. Specific examples of the non-woven fabric sheet includes a sheet formed by spreading polyethylene fibres in a sheet-like pattern and bonding the polyethylene fibres by heat and pressure.

The supply of a surface covering raw material preferably comprises an unwinder roller or any other suitable apparatus.

In a preferred embodiment of the method of the present invention, the step of supplying a surface covering raw material comprises a first step of supplying a substrate and a second step of applying the liquid resin layer to the substrate. This is particularly preferred, as it has been found that the surface covering raw material in the form with the uncured or ungelled liquid resin layer is particularly susceptible to damage. It is preferable to apply the pattern as soon as possible after the liquid resin layer is applied to the substrate, preferably no more than one hour after and more preferably no more than 30 minutes after. Any suitable method may be used for applying the liquid resin layer to the substrate. For example, screen coating may be used.

Similarly, the apparatus of the present invention preferably comprises a liquid resin layer coater for applying a liquid resin layer to a substrate.

The liquid resin layer according to the present invention comprises a resin dispersed in a carrier liquid, the liquid resin layer being capable of undergoing a phase transition from liquid to solid, for example by gelling or curing with the carrier liquid. Preferably, the resin is capable of gelling or curing with the carrier liquid when the resin and the carrier liquid are heated to a predetermined temperature. The predetermined temperature is preferably equal to or greater than the glass transition temperature of the resin. The temperature is suitably around 100-220° C., preferably 120-200° C., more preferably 140-160° C., suitably around 150° C.

In other embodiments, the liquid resin layer may be capable of undergoing a phase transition from liquid to solid for example by evaporation of a solvent, or by chemical curing, for example by crosslinking. The phase transition may be caused by heating, by exposure to radiation (for example, visible or ultra violet light) or by any other suitable means or by a combination of them. Preferably, the phase transition comprises a transition from a sol to a gel. Such systems (particularly, PVC and acrylic resin based systems) are widely used in the production of surface coverings such as wall paper.

The liquid resin layer comprises a resin and a carrier liquid and, optionally, other components selected from a foaming agent, a foaming accelerator, a filler, a dispersant, a defoamer, an antiblocking agent, and a thickener. Suitable compositions are disclosed for example in U.S. Pat. No. 3,321,413.

The resin may be any suitable resin, but is preferably vinyl resin, acrylic resin or acrylic resin copolymer, preferably vinyl resin and most preferably polyvinylchloride. Polyvinyl chloride is preferably used because of its good chemical and physical properties and low cost.

The liquid resin layer is preferably applied as a liquid composition which comprises a mixture of the resin and the carrier liquid and, optionally other components as set out above. Suitably, where the resin is polyvinyl chloride, the liquid layer is applied in the form known as 'PVC paste'. It may be obtained commercially, for example under the trade mark PS1652 Expandable PVC Plastisol. The mixture may be in any suitable form, for example an emulsion or a suspension of particulate solid material in a liquid. In a preferred embodiment, the liquid composition comprises the resin in powder form dispersed in a carrier liquid.

Preferably, the resin is present in the carrier liquid in an amount of 100 parts by weight of resin to 30-100 parts by weight of carrier liquid.

Specific examples of the filler include, but are not limited to, aluminium hydroxide, magnesium hydroxide, barium hydroxide, calcium carbonate, magnesium carbonate, calcium sulphate, barium sulphate, ferrous hydroxide, basic zinc carbonate, basic lead carbonate, silica sand, clay, talc, silica, titanium dioxide and magnesium silicate. Among these materials, calcium carbonate, magnesium carbonate, aluminium hydroxide, and magnesium hydroxide are preferred.

The carrier liquid preferably comprises an ester oil. Preferably, the carrier liquid comprises a liquid plasticizer. Specific examples of the plasticizer include, but are not limited to, ester-based plasticizers such as phthalate-based plasticizer such as dibutyl phthalate, dinonyl phthalate (DNP), dioctyl phthalate (DOP), dodecyl phthalate (DDP), diisodecyl phthalate (DIDP), diisononyl phthalate (DINP), ditridecyl phthalate (DTDP), and n-hexyl-n-decyl phthalate (NHDP); phosphate based plasticizer such as tri-2-ethylhexyl phosphate (TOP); adipate-based plasticizer such as didecyl adipate (DDA), dioctyl adipate (diethylhexyl adipate: DOA), diisononyl adipate (DINA) and diisodecyl adipate (DIDA); trimellitate-based plasticizer such as trioctyl trimellitate (TOTM), and tri-n-octyl-n-decyl trimellitate (nonyl DTM); polyester based plasticizer; epoxy-based plasticizer; sebacate-based plasticizer; azelate-based plasticizer; citrate based plasticizer such as acetyl tributyl citrate (ATBC); glycolate-based plasticizer; ricinolate-based plasticizer; maleate-based plasticizer; fumarate-based plasticizer; benzoate plasticizers; pyromellitate-based plasticizer and itaconate-based plasticizer. Preferably, diisononyl phthalate (DINP) is used.

The viscosity of the carrier liquid is preferably in the range from 5 to 30 mPas, more preferably from 8 to 18 mPas, most preferably from 10 to 12 mPas at 45° C. Viscosity is preferably measured using a Brookfield DV-III Ultra Programmable Rheometer.

Other embodiments of the liquid resin composition include a solvent based resin composition, for example one in which a resin is dissolved or dispersed in a volatile organic solvent. However, it is preferred that the liquid resin composition comprises less than 1% by weight and more preferably less than 0.1% by weight of volatile organic compound solvent. A volatile organic compound solvent is preferably as defined by the EU Directive 1999/13/EC (Solvent Emissions Directive), an organic compound having at 293.15 K a vapour pressure of 0.01 kPa or more. It is desired to reduce the amount of volatile organic compound solvent used for environmental and health reasons. The inventors have discovered that compositions can be produced which are non-aqueous and which have little or no volatile organic compound solvent and which can be used in the method of the invention.

Preferably, the liquid resin composition is non-aqueous. Preferably, the content of water in the liquid resin composition is less than 1% by weight, more preferably less than 0.1 weight percent.

The purpose of a foaming agent is to produce a foamed effect in the surface covering. Suitably, the foaming agent is adapted to produce a foamed effect in the surface covering when heated, for example when heated to a foaming temperature which may be in the range 200-210° C. The foaming agent may be an inorganic foaming agent or an organic foaming agent. Specific examples of the organic foaming agent include, but are not limited to, azodicarbonamide (ADCA), azobisisobutyronitrile (AIBN), p,p'-oxybisbenzenesulfonohydrazide (OBSH) and dinitrosopentamethylenetetramine (DPT). Preferably azodicarbonamide is used.

The purpose of the accelerator is to reduce the temperature at which the foaming effect occurs. For example, with accelerator the foaming effect may occur at a lower foaming temperature which may be in the range 150-160° C. The accelerator may be selected from compounds of cadmium, lead and zinc such as stearates, octoates, naphthenates and benzoates, which lower the decomposition temperatures of azodicarbonamide.

According to the invention, in the supplying step, the resin is dispersed in the carrier liquid but it is not already cured or converted into a gel with the carrier liquid to a significant extent. Preferably, the carrier liquid can form a gel with the resin by heating as discussed above.

Preferably, there is no treatment step between the step of applying the liquid resin layer to the substrate and the step of applying a pattern to the liquid resin layer which would have the effect of causing the liquid resin layer to undergo a phase transition from liquid to solid.

According to the present invention, a pattern is formed on the liquid resin layer by inkjet printing.

The pattern may suitably comprise a visible pattern. It may additionally or alternatively comprise a pattern of a foaming inhibiting composition applied in order to allow the liquid resin layer to obtain a three-dimensional texture in a subsequent foaming step. The foaming inhibiting composition may also provide a visible pattern. If a foaming inhibiting composition is applied, it is preferably a non-aqueous foaming inhibiting composition.

By "non-aqueous" it is meant that water is not used as a solvent. Preferably, the content of water in the foaming inhibiting composition is less than 1% by weight, more preferably less than 0.1 weight percent. The composition of the foaming inhibiting composition will be described in detail further below.

Any suitable inkjet printing apparatus and method may be used. For example, a RICOH Pro 4130 (trademark) wide format latex colour printer may be used.

In a preferred embodiment the surface covering raw material is fed as a continuous sheet. Further, it is preferred that the inkjet printing apparatus comprises a drum, the axis of rotation of the drum being orientated at right angles to the direction of feed of the sheet-like surface covering raw material, the sheet-like surface covering raw material being wound around the drum. Preferably, the drum is of relatively large diameter, being preferably in the range 0.1-2 metres, more preferably 0.5-1.5 metres and preferably about 1 metre in diameter. At least one inkjet printing head is mounted adjacent the drum for applying the pattern forming composition to the surface covering raw material while the surface covering raw material is on the outer peripheral surface of the drum. Preferably, the feed speed of the surface covering raw material is 50 to 100 metres per minute, preferably 70 metres per minute.

In an alternative embodiment, the inkjet printing apparatus comprises a plurality of drums, at least one inkjet printing head being mounted adjacent to at least one drum. The drums are preferably mounted with their axes parallel. Preferably, the axes lie on a curved surface, so that the surface covering raw material can be tensioned around the drums.

The surface covering raw material may be heated while the pattern is applied. It may be heated to a temperature in the range 25-100° C. Heating the surface covering raw material can assist penetration of a pattern forming composition into the liquid resin layer and thereby enhance the penetration or foaming inhibiting effect. The surface covering raw material should preferably not be heated to a temperature which is greater than or equal to a temperature at which foaming occurs in order to prevent premature foaming of the resin layer.

However, it is a further advantage of the present invention that it has been found that it is not necessary to heat the surface covering raw material while the pattern is applied, or the temperature to which it is heated can be selected for other process considerations, such as viscosity of the pattern forming material.

The foaming inhibiting composition comprises a foaming inhibiting material. The foaming inhibiting material is one which is effective to inhibit foaming of the foamable layer. The composition of the foaming inhibiting material will depend upon the foamable layer used. For example, the foaming inhibiting material may be as specified in U.S. Pat. No. 5,712,018.

If used, the foaming inhibiting composition may operate by any suitable route. For example, it may operate so as to inhibit the foaming reaction itself, so that the foaming reaction will not occur at the foaming temperature or lower foaming temperature. Suitable inhibitors for inhibiting the foaming reaction are disclosed in U.S. Pat. No. 3,293,094.

Alternatively, the foaming inhibitor may operate by inhibiting the action of the accelerator. In particular, preferably, the foaming inhibitor inhibits the accelerator so that foaming does not occur at the lower foaming temperature. For example, if the foaming temperature is in the range 150-160° C., the foaming inhibitor may prevent operation of the accelerator in this temperature range.

The foaming inhibitor that operates by deactivating a foaming accelerator is suitably selected from benzotriazole derivatives, tolutriazole derivatives, N,N'-Diphenyloxamide, N,N-dibezoylhydrazine, N-Salicylal-N'(salicyloyl)hydrazide, N,N'-Bis(salicyloyl)hydrazide, N,N'-Bis(3,5-di-tert-butyl-4-hydroxyphenylpropionyl)hydrazine, 3-N-Salicyloylamino-1,2,4-triazole, decamethylene dicarboxylic acidbis(N'-salicyloylhydrazide), bis(benzylidene)oxalyl dihydrazide and oxanilide. Preferably, it is selected from benzotriazole derivatives and tolutriazole derivatives, for example N,N-bis (2-ethylhexyl)-4-methyl-1H-benzotriazole-1-methylamine.

The foaming inhibiting composition comprises foaming inhibitor and may suitably comprise other components selected from a diluent such as a plasticizer or an oily component and a colourant.

It is particularly preferred that at least part of the plasticizer should be the same as the plasticizer or compatible with the plasticizer, if one is present in the liquid resin layer of the surface covering raw material. This is found to enhance penetration of the foaming inhibiting material into the foamable layer which improves the foaming inhibiting effect. Preferably, at least 30% by weight of the plasticizer is the same as a plasticizer which is present in the liquid resin layer of the surface covering raw material, more preferably at least 50% by weight and most preferably over 75% by weight.

Specific examples of the plasticizer or oily component include phthalic acid esters such as dibutyl phthalate, dioctyl phthalate (DOP); adipic acid esters such as dioctyl adipate (diethylhexyl adipate; DOA), benzoate plasticzer and diisononyl adipate (DINA). Preferably, dioctyl adipate is used.

The content of the foaming inhibiting material in the foaming inhibiting composition is preferably in the range from 5% to 100% by weight. If the content is less than 5% by weight, the foaming inhibiting effect is likely to be insufficient. Preferably, the content of the foaming inhibiting material is in the range from 5% to 70%, more preferably from 20% to 50%. By reducing the quantity of the foaming inhibiting material, the viscosity may be reduced. Preferably, the quantity of the diluent is in the range 0-95% by weight, preferably 30-95% by weight, more preferably 50-80% by weight. Increasing the diluent such as plasticizer or oily component can decrease the viscosity.

The viscosity of the foaming inhibiting composition is preferably in the range from 5 to 30 mPas, more preferably from 8 to 18 mPas, most preferably from 10 to 12 mPas at 45° C. Viscosity is preferably measured using a Brookfield DV-III Ultra Programmable Rheometer.

The inkjet print head for applying the foaming inhibiting composition may be heatable to control the viscosity. For example it may be heatable to a temperature in the range 30° C. to 60° C., most preferably around 45° C.

Preferably, the pattern is applied using at least two colours. In accordance with normal inkjet printing techniques, a first colour ink is applied first and at least a second colour ink is applied subsequently.

The present invention is found to have particularly beneficial effects with respect to registration of the different colours. In conventional inkjet printing onto a solid substrate, the first colour dries to some extent before the second colour is applied. For example, UV fixing of printed inks may be used. Then, if it desired to print a colour by combining two colours, registration of the first application and second application has to be very good, so that one colour is seen in the finished product. However, in the present invention, the ink drop applied first may remain liquid at the time of the second application. It is then found that good mixing of the two colours can occur, as the inks are liquid. In turn, it is found that this can require a lower accuracy of registration.

For example, full colour inkjet printing may be used. Conventional black, cyan, magenta and yellow printing heads may be used. In the embodiment in which the surface covering raw material is fed around a drum, at least one inkjet printing head for forming a visible image is preferably mounted adjacent the drum. In the embodiment in which the surface covering raw material is fed around a plurality of drums, at least one inkjet printing head for forming a visible image is preferably mounted adjacent at least some of the drums.

Preferably, the foaming inhibiting applying inkjet printing head is located downstream of the at least one visible image inkjet printing head. This is found to give improved image density than if the visible image is applied after the foaming inhibiting composition.

The method of the present invention further comprises the step of heating the liquid resin layer after application of the pattern. Similarly, the apparatus may include a foaming apparatus for heating the surface covering raw material after application of the pattern forming composition. Suitably, foaming is achieved by heating the foamable layer. Preferably, it is heated to a temperature in the range 150-250° C., preferably 180-220° C. and most preferably about 200° C. Any conventional foaming apparatus may be used. In the heating step, a gel is formed comprising the carrier liquid and the resin and, preferably, foaming occurs at the same time. It is found that in this way, the pattern applied shows excellent image density and durability.

Where the visible pattern is formed using an inkjet ink, preferably an oil-based ink is used.

The oil-based ink preferably comprises a carrier such as an oily component and a colorant. The oil-based ink may optionally include a binder resin.

Preferably, the oily component is comprised primarily of an ester oil.

Specific examples of the ester oil include, but are not limited to, phthalic acid esters such as dibutyl phthalate, dicapryl phthalate, diisodecyl phthalate, dioctyl phthalate (DPO), diisononyl phthalate, butyl-2-ethylhexyl phthalate, and di-2-ethylhexyl phthalate; adipic acid esters such as dioctyl adipate (diethylhexyl adipate: DOA) and diisononyl adipate (DINA); sebacic acid esters such as dibutyl sebacate, dioctyl sebacate, and diisononyl sebacate; citric acid esters such as acetyl tributyl citrate (ATBC); azelaic acid esters such as dibutyl azelate, dioctyl azelate, and diisononyl azelate; lauric acid esters such as methyl laurate, ethyl laurate, and isobutyl laurate; myristic acid esters such as isopropyl myristate, isocetyl myristate, and octyldodecyl myristate; palmitic acid esters such as isopropyl palmitate and octyl palmitate; octanoic acid esters such as cetyl octanoate, octyl octanoate (ethylhexyl ethylhexanoate: OOE), and isononyl octanoate; and isononanoic acid esters such as ethylhexyl isononanoate and isononyl isononanoate.

The viscosity of the oily component is preferably in the range from 5 to 30 mPas, more preferably from 8 to 18 mPas, most preferably from 10 to 12 mPas at 45° C. Viscosity is preferably measured using a Brookfield DV-III Ultra Programmable Rheometer.

It is particularly preferred that at least part of the oily component should be the same as the plasticizer or compatible with the plasticizer, if one is present, in the liquid resin layer of the surface covering raw material.

Among these materials, adipic acid esters, such as dioctyl adipate and diisononyl adipate, and octanoic acid esters, such as octyl octanoate, are preferably used for inkjet imaging systems.

It is preferred that the inkjet ink comprises less than 1% by weight and more preferably less than 0.1% by weight of volatile organic compound solvent. A volatile organic compound solvent is preferably as defined by the EU Directive 1999/13/EC (Solvent Emissions Directive), an organic compound having at 293.15 K a vapour pressure of 0.01 kPa or more. It is desired to reduce the amount of volatile organic compound solvent used for environmental and health reasons. The inventors have discovered that compositions can be produced which are non-aqueous and which have little or no volatile organic compound solvent and which can be used in the method of the invention.

Preferably, the inkjet ink composition is non-aqueous. Preferably, the content of water in the liquid resin composition is less than 1% by weight, more preferably less than 0.1 weight percent.

Specific examples of the colorant included in the oil-based ink include, but are not limited to, carbon black, pigments such as azo pigments, phthalocyanine pigments, nitroso pigments, nitro pigments, vat-dye pigments, mordant-dye pigments, basic-dye pigments, acid-dye pigments, and natural-dye pigments; and oil-soluble dyes such as diazo dyes and anthraquinone dyes. Each of these dyes and pigments can be used alone or in combination with others.

The inkjet ink may comprise other known components. For example, it may include an initiator to cause a cross-lining reaction of the carrier. For example, a UV or heat activated initiator may be used.

Optionally, the present invention further comprises a coating step, for applying a suitable coating material to the surface covering raw material to provide an additional level of surface protection. The coating material may be applied by gravure printing. The coating step may take place before or after the application of the image to the liquid resin layer, or at the same time. It may occur before foaming or after foaming.

The coating material may be any conventional coating material. The coating is preferably a water based composition. The aqueous nature may then limit bleeding of the pattern applied to the liquid resin layer, as the liquid resin layer and pattern are preferably non-aqueous or oil based and immiscible with the coating material.

The apparatus of the present invention suitably comprises a gravure coater for applying a surface finish to the surface covering raw material.

DETAILED DESCRIPTION OF THE DRAWING

FIG. 1 shows an apparatus 1 according to the present invention for forming a surface covering. The apparatus 1 comprises a supply of surface covering raw material 10. The supply of surface covering raw material comprises an unwinder roller 11 for supplying a continuous sheet of sheet-like substrate. The sheet-like substrate is fed to a screen coater 12 in which a liquid resin layer according to the invention is formed on the substrate to form a surface covering raw material. The apparatus further comprises an inkjet printing station 20 comprising a drum 21 of diameter about 1 metre. Arranged around the drum there are inkjet printing heads 22, including a foaming inhibiting composition applying inkjet printing head and yellow, black, cyan and magenta colour printing heads.

The apparatus of the present invention comprises a pre-gelling/curing oven 30 in which the surface covering raw material is heated to a temperature in the range of 120-200° C., preferably 150° C., in order to partially gel or cure the liquid resin layer so that it undergoes a phase transition from liquid to solid. There is also provided a gravure coater/roller 40 for applying a surface finish to the surface covering raw material. The present invention further comprises a heating apparatus 50 in which the surface covering raw material is heated to a temperature in the range of 150-250° C., preferably 200° C., to fully gel or cure the liquid resin layer, and activate the foaming agent. In the heating apparatus, the liquid resin layer is simultaneously gelled and foamed. The foamable layer foams at least in parts where the foaming inhibiting composition has not been applied, so that a three-dimensional textured surface is obtained. Finally, the finished surface covering is wound onto a roller rewinder 60 for storage and further transportation.

Figure 2A:
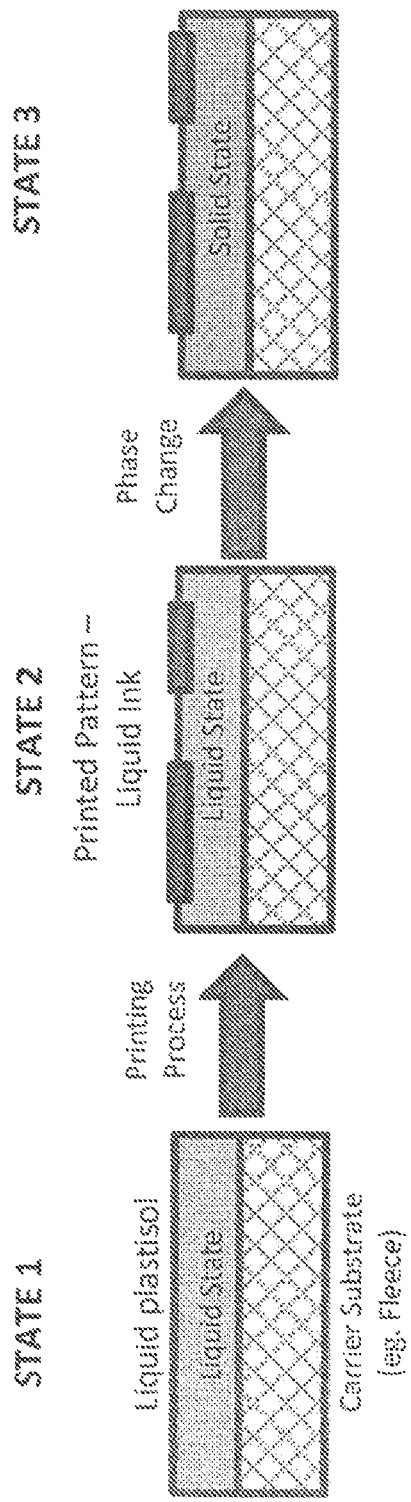
FIG. 2A schematically depicts an example method of forming a surface covering of the present invention.
Figure 2C:
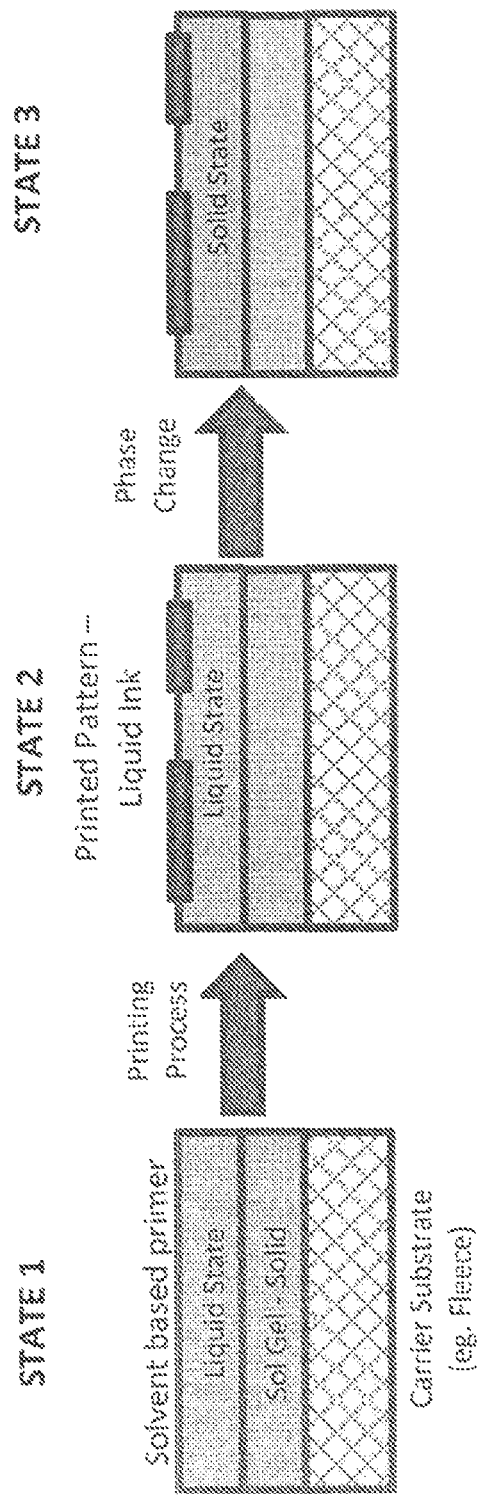
FIG. 2C schematically depicts an example method of forming a surface covering of the present invention.

FIGS. 2A to 2C schematically depict three example methods of forming a surface covering of the present invention. In FIG. 2A, a liquid resin layer (liquid plastisol, which is a liquid pre-gel layer) comprising a resin and a carrier liquid is applied to a substrate, to form a surface covering raw material (state 1). A pattern is then applied on the liquid resin layer, while the liquid resin layer is still in a liquid state (state 2). Finally, the liquid resin layer is caused to undergo a phase transition from liquid to solid, for example being gelled by heating, to thereby provide a surface covering (state 3). In a further embodiment (not shown), a solvent-based primer may be used instead of a liquid plastisol as the liquid resin layer.

In FIG. 2B, a solid sol gel layer is provided on the substrate. A liquid resin layer (liquid plastisol) comprising a resin and a carrier liquid is then applied to the sol gel layer, to form a surface covering raw material (state 1). A pattern is then applied on the liquid resin layer, while the liquid resin layer is still in a liquid state (state 2). Finally, the liquid resin layer is caused to undergo a phase transition from liquid to solid, for example being gelled to thereby provide a surface covering (state 3).

In FIG. 2C, a solid sol gel layer is provided on the substrate. A liquid resin layer (solvent based primer) comprising a resin and a carrier liquid is then applied to the sol gel layer, to form a surface covering raw material (state 1). A pattern is then applied on the liquid resin layer, while the liquid resin layer is still in a liquid state (state 2). Finally, the liquid resin layer is caused to undergo a phase transition from liquid to solid, for example being cured to thereby provide a surface covering (state 3).

EXAMPLES

Example 1

The apparatus for forming a surface covering 1 according to the present invention was used to provide wallpaper except that the inkjet print head 22 for applying foaming inhibiting composition was not used.

The wallpaper comprised a paper having a fleece backing. A liquid plastisol resin layer composition was applied to the fleece-backed paper obtainable from Speciality Coatings (Darwen) Ltd: PS1652 Expandable PVC Plastisol. The resulting liquid coat PVC paste was printed at 25° C.

Comparative Example 1

The same ink jet printer as used in Example 1 was used to print an image onto a conventional surface covering raw material comprising a semi-cured solid acrylic plastisol layer.

Crock Meter Test Results

TABLE 1

|  | Example 1 | Comparative Example 1 |
|---|---|---|
| ID before rub | 1.04 | 0.83 |
| ID after rub | 1.03 | 0.65 |
| % ID loss on rub | 1.0 | 21.7 |
| Dot gain (micron) | 79 | 55 |

ID refers to image density. This gives a value of the intensity of the colour of the print (higher value is more intense). The value was measured on a X-Rite 500 Series Spectrodensitometer (made by X-Rite).

The Crockmeter Test was carried out as follows:
 Equipment: AATCC Crockmeter, Model CM1.
 Cloth: 'Crockmeter Squares' available from TESTFABRICS, INC, (USA).
 ID measured on coating before and after 10 cycles with cloth using Crockmeter. Test undertaken at ambient temperature (20° C.).

It can be seen that a pattern printed on a liquid resin layer according to the present invention exhibits very good resistance to rubbing. Comparative Example 1, representing a conventional process showed poorer resistance to rubbing.

The present invention has been described above by way of example only and modifications can be made within the spirit of the invention. The invention extends to equivalents of the features described. The invention also consists in any individual features described or implicit herein or shown or implicit in the drawing or any combination of any such features or any generalisation of any such features or combination.

CROSS-REFERENCE TO RELATED APPLICATIONS

This application is based upon and claims the benefit of priority of European Priority Application No. 16204418.4 filed on Dec. 15, 2016, the entire contents of which are hereby incorporated by reference.

The invention claimed is:

1. A method of forming a surface covering, comprising the steps of:
 supplying a substrate;
 applying a liquid resin layer to the substrate, thereby forming a surface covering raw material, the liquid resin layer comprising a resin dispersed in a carrier liquid, and being capable of undergoing a phase transition from liquid to solid;
 discharging ink to the liquid resin layer by an inkjet printhead so as to form a pattern by inkjet printing, said ink being discharged to the liquid resin layer separately from the liquid resin layer, and
 causing the liquid resin layer with the pattern formed on the liquid resin layer to undergo a phase transition from liquid to solid to thereby prepare a surface covering,
 wherein the ink is an oil-based ink, and the oil-based ink comprises an oily component,
 the liquid resin layer of the surface covering raw material comprises a plasticizer selected from the group consisting of phthalate-based plasticizer, phosphate based plasticizer, adipate-based plasticizer, trimellitate-based plasticizer, polyester based plasticizer, epoxy-based plasticizer, sebacate-based plasticizer, azelate-based plasticizer, citrate based plasticizer, glycolate-based plasticizer, ricinolate-based plasticizer, maleate-based plasticizer, fumarate-based plasticizer, benzoate plasticizers, pyromellitate-based plasticizer and itaconate-based plasticizer, and the oily component is selected from the group consisting of phthalic acid esters, adipic acid esters, sebacic acid esters, citric acid esters, azelaic acid esters, lauric acid esters, myristic acid esters, palmitic acid esters, octanoic acid esters, and isononanoic acid esters.

2. The method of claim 1, wherein the surface covering raw material is not subjected to heating, which causes any curing or gelling treatment, after application of the liquid resin layer and before discharging the ink to form the pattern.

3. The method according to claim 1, wherein the ink is discharged no more than one hour after the liquid resin layer is applied to the substrate.

4. The method according to claim 1, wherein the liquid resin layer of the surface covering raw material comprises a resin and a carrier liquid and, optionally, other components selected from a foaming agent, a foaming accelerator, a filler, a dispersant, a defoamer, an antiblocking agent, and a thickener.

5. The method according to claim 1, wherein the liquid resin layer of the surface covering raw material comprises vinyl resin.

6. The method according to claim 5, wherein the vinyl resin includes at least one of PVC, azodicarbonamide, diisononyl phthalate or zinc stearate.

7. The method according to claim 1, wherein the liquid resin layer of the surface covering raw material comprises an acrylic polymer resin or an acrylic copolymer resin, and the liquid resin layer of the surface covering raw material further comprises azodicarbonamide and zinc stearate.

8. The method according to claim 1, wherein the pattern comprises at least one of a visible pattern and a pattern of a foaming inhibiting composition.

9. The method according to claim 1, wherein the oil-based ink comprises at least one of a colorant and a foaming inhibiting component.

10. The method according to claim 9, wherein the oily component is the same as a plasticizer or compatible with a plasticizer in the liquid resin layer of the surface covering raw material.

11. The method according to claim 1, further comprising a coating step, for applying a coating material to the surface covering raw material to provide an additional level of surface protection.

12. The method according to claim 1, wherein the pattern is applied no more than 30 minutes after the liquid resin layer is applied to the substrate.

13. The method of claim 1, wherein the surface covering raw material is subjected to a partial curing treatment or a partial gelling treatment after application of the liquid resin layer before application of the pattern.

14. The method of claim 1, wherein the ink used for the inkjet printing is heated and jetted to the surface covering raw material while a temperature of the surface covering raw material is in a range 25-100° C.

15. The method of claim 1, wherein the inkjet printhead is heated in a range 30° C. to 60° C.

* * * * *